May 16, 1961
K. WILFERT
2,984,516
SLIDING DOOR CONSTRUCTION
Filed Dec. 6, 1957
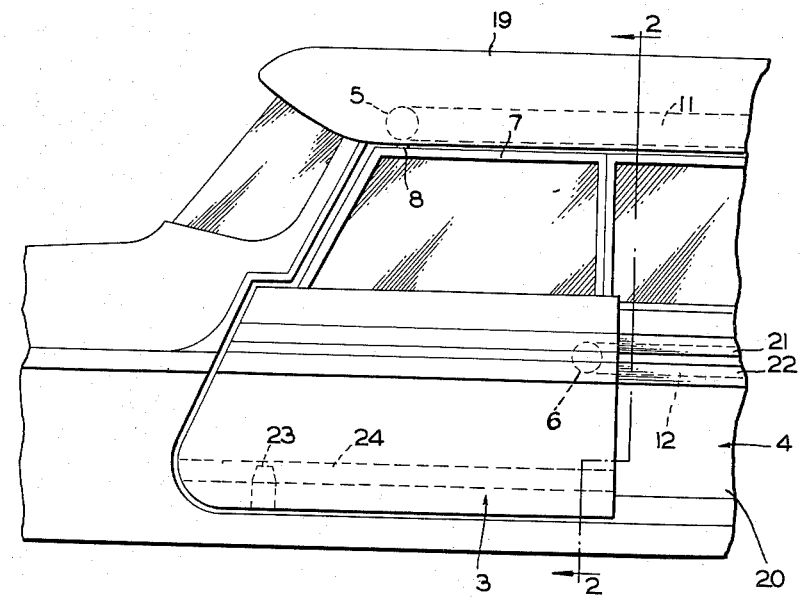
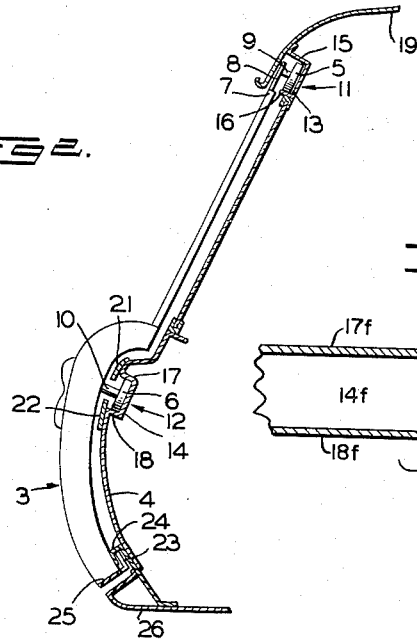
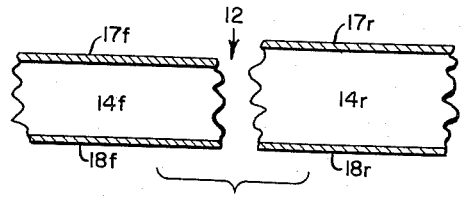
INVENTOR
KARL WILFERT
BY *Dicke and Craig*
ATTORNEYS.

2,984,516
SLIDING DOOR CONSTRUCTION

Karl Wilfert, Stuttgart-Degerloch, Germany, assignor to Daimler-Benz Aktiengesellschaft, Stuttgart-Untertuerkheim, Germany Filed Dec. 6, 1957, Ser. No. 701,229

Claims priority, application Germany Dec. 14, 1956

2 Claims. (Cl. 296—47)

The present invention relates to a sliding door, especially for motor vehicles, which is slidingly guided by means of two guide elements, particularly rollers, which simultaneously transmit the weight of the door to the rigid vehicle wall.

The present invention essentially consists in that one guide element is arranged in proximity to the forward door edge approximately at the height of the upper window frame and the other guide element is arranged in proximity to the rear door edge, approximately at half the door height.

A sliding door according to the present invention is characterized by the fact that as a result of the relatively large spacing or distance of the guide elements from one another in the longitudinal direction of the vehicle and in the vertical distance thereof, it distinguishes itself by a relatively tight fit and safe seating of the closed door which prevents rattling.

In order to increase the accuracy of the guidance for the door in the lateral direction and for improving the tight seating thereof, the present invention proposes a construction for the door so as to be further guided laterally at a point distant from both previously mentioned guide elements, preferably within the region of the forward lower door corner by means of a third guide element which, however, is relieved of the task of transmitting the weight of the door to the rigid vehicle wall.

In order to further improve the tight seating of the door in the closed condition thereof, the guide rails advantageously become narrower in proximity to the forward end parts thereof.

Accordingly, it is an object of the present invention to provide a guide arrangement for sliding doors of motor vehicles which prevents rattling of the door, and which assures proper and tight seating of the door in the closed condition thereof.

Still another object of the present invention is the provision of an improved guide arrangement which guides the sliding vehicle door with greater accuracy.

A still further object of the present invention lies in the provision of an additional anti-rattle guide support for the sliding door which is relieved of the task of transmitting the weight of the door to the relatively stationary vehicle part.

These and other objects, features and advantages of the present invention will become more obvious from the following description when taken in connection with the accompanying drawing which shows, for purposes of illustration only, one embodiment in accordance with the present invention and wherein:

Figure 1 is a partial side view of a motor vehicle provided on each side of the vehicle with a sliding door, Figure 2 is a cross-sectional view taken along line 2—2 of Figure 1, in which only those parts of one vehicle side are illustrated which are of significance in the present invention, the other side of the vehicle and door thereof being constructed in a mirror-image-like manner, and Figure 3 is an enlarged cross-sectional view, partly broken away, of the forward and rear portions of one of the door rails.

Referring now the drawing, wherein like reference numerals are used throughout the two views to designate corresponding parts, reference numeral 3 generally designates the vehicle door which is constructed as a sliding door. The door 3 is secured at the relatively stationary vehicle part or wall 4 by means of two rollers 5 and 6 which simultaneously transmit the weight of the vehicle door to the vehicle wall 4 and guide the vehicle door thereat. One roller 5 is disposed in proximity of the forward door edge, approximately at the height of the upper window frame 7 while the other roller 6 is arranged in proximity of the rear door edge approximately at half the height of the door. The roller 5 is supported on a pin 9 secured to a projection 8 of the upper window frame 7 while roller 6 is supported on a pin 10 secured to the vehicle door frame.

The guide rails for the rollers 5 and 6 are generally designated by reference numerals 11 and 12 which consist each of a profile bearer member open to one side thereof and each including a web portion 13 and a web portion 14 followed by two leg portions 15 and 16 and two leg portions 17 and 18, respectively, secured to the web portions 13 and 14 at essentially right angle with respect thereto. The web portions 13 and 14 are inclined inwardly in parallel to the plane of the door and corresponding to the tapering configuration of the vehicle body with respect to a vertical plane. As a result of such inclination, the rollers 5 and 6 are maintained automatically in the guide rails 11 and 12 by the influence or effect of the weight of the vehicle door itself.

The guide rail 11 is secured at the vehicle roof 19 while the guide rail 12 is secured at the wall of the vehicle section 20 which is disposed behind the door when the door 3 is closed and which is off-set with respect to the door in the inward direction. The guide rail 11 together with the projection 8 carrying the pin 9 of the upper window frame 7 is covered against the outside by the vehicle roof 19 while the guide rail 12 is covered by two decorative strips 21 and 22 which cover the same from above and below so as to leave only a relatively narrow gap through which the pin 10 may extend.

In the construction according to the present invention, the door is further guided laterally at a third point which is located at a distance from both rollers 5 and 6, namely within the region of the forward lower door corner by means of a guide tongue which is relieved from the transmission of the weight of the vehicle door to the relatively stationary vehicle wall 4 and which is guided in a guide rail 24 also extending essentially horizontally. A flat angularly bent steel bar or the like serves as guide tongue 23 which is secured to the lower door edge 25. The flat steel bar 23 extends into the guide rail 24 which is of inverted U-shape in cross section and open toward the bottom thereof. The guide rail 24 is secured in any suitable manner to the door sill or threshold 26.

In proximity to the forward end parts thereof, the guide rails become narrower and, more particularly, the guide rails 11 and 12 are reduced in height while the guide rail 24 is reduced in the inside diameter or width thereof. The reduction in height of the guide rails 11 and 12 necessarily comprehends the reduction of width of the web portions 13 and 14. These, in accordance with the narrowing of the guide rails are, in proximity to their forward end parts, of a width narrower than the remainder of the web portions. This narrower width necessarily is effective to cause correspondingly narrower spacing of the leg portions 15, 16 and 17, 18 in proximity to their forward end parts, this narrower spacing adapting the leg portions for tight engagement with the rollers 5 and 6, respectively, in the closed position of the door. Similar tight engagement of guide rail 24 and guide tongue 23 is secured by the similar reduction in the height of this guide rail. By the use of such a construction, which goes beyond the relatively tight seating of the door 3 and which exists anyhow, a rattling thereof in the closed condition of the door is completely rendered impossible and is, therefore, effectively eliminated. Figure 3 illustrates, in somewhat exaggerated form, the narrower width of the forward portion 14f of web 14 of rail 12 as compared with the rear portion 14r, this narrower width affording the tight engagement before referred to, the corresponding leg portions being designated 17f, 18f and 17r, 18r, respectively. Inasmuch as the other guide rails 11 and 23 are formed in like manner, further illustration of these rails is deemed unnecessary.

While I have shown and described one embodiment in accordance with the present invention, it is understood that the same is susceptible of many changes and modifications within the spirit of the present invention and I intend to cover all such changes and modifications as encompassed by the appended claims.

I claim:

1. A sliding door for a motor vehicle having a relatively stationary part, comprising spaced guide means for slidingly guiding said door on said relatively stationary part and simultaneously transmitting the weight of said door to said part, one of said guide means comprising a roller member disposed in proximity to one corner of said door, another of said guide means comprising a roller member disposed near the rear edge of said door, said two last-named guide means each including rail means secured to said relatively stationary part for guiding each said roller member in a direction longitudinal of said motor vehicle throughout the movement of said door to closed position, each said rail means comprising a guide rail supporting one said roller member, each said guide rail comprising a web portion and two spaced leg portions, each said web portion in proximity to its forward end part being of a width narrower than the remainder of said web portion, said web portion of narrower width being effective to cause correspondingly narrower spacing of said leg portions in proximity to their forward end parts, said narrower spacing adapting said leg portions for tight engagement with opposite peripheral portions of said one said roller member to prevent rattling of said door, said spaced guide means including further guide means, said further guide means being relieved from transmitting the weight of said vehicle door to said relatively stationary part while preventing rattling of said door.

2. Guide means for a sliding door for a motor vehicle having a relatively stationary part, said guide means slidingly guiding said door on said relatively stationary part and simultaneously transmitting the weight of said door to said part, said guide means including two guide members, one of said guide members being disposed in proximity to one corner of said door and the other of said guide members being disposed in proximity to the rear edge of said door, further guide means for slidingly guiding said door, said further guide means being relieved from transmitting the weight of the vehicle door to said relatively stationary part while preventing rattling of said door, said further guide means including a guide tongue secured to the lower edge of said door and further including a guide rail having leg portions connected by an intermediate portion and disposed in the shape of an inverted U, said guide rail being secured to said relatively stationary part, said guide tongue extending into said guide rail, said guide rail being effective to guide said tongue in a direction parallel to the longitudinal center line of said motor vehicle throughout movement of said door to closed position thereof, said intermediate portion in proximity to its forward end being of less width than the remainder of said intermediate portion and causing a correspondingly narrower spacing of said leg portions in proximity to their forward ends than the spacing of the remainder of said leg portions, said narrower spacing adapting said leg portions for tight engagement with said tongue when said door is in said closed position to prevent rattling of said door.

References Cited in the file of this patent

UNITED STATES PATENTS

| | | |
|---|---|---|
| 973,701 | Ricker | Oct. 25, 1910 |
| 1,920,855 | Gloekler | Aug. 1, 1933 |
| 1,928,523 | Bally | Sept. 26, 1933 |
| 2,445,131 | Wartian | July 13, 1948 |
| 2,878,054 | Linder | Mar. 17, 1959 |

FOREIGN PATENTS

| | | |
|---|---|---|
| 858,929 | Germany | Dec. 11, 1952 |
| 621,274 | Great Britain | Apr. 6, 1949 |
| 671,387 | Great Britain | May 7, 1952 |